United States Patent [19]

Nutt

[11] Patent Number: 4,676,130
[45] Date of Patent: Jun. 30, 1987

[54] LUMBER EDGER

[75] Inventor: Michael D. Nutt, Richfield, Wis.

[73] Assignee: Filer & Stowell Co., Inc., Milwaukee, Wis.

[21] Appl. No.: 832,963

[22] Filed: Feb. 25, 1986

[51] Int. Cl.$^4$ .............................................. B27B 5/04
[52] U.S. Cl. .................................... 83/155; 83/282;
83/460; 83/471.2; 83/486; 83/488; 83/520
[58] Field of Search ............... 83/471.2, 485–488,
83/520, 522, 155, 521, 278, 423, 282, 460;
144/376–378

[56] References Cited

U.S. PATENT DOCUMENTS

| | | | |
|---|---|---|---|
| 3,871,258 | 3/1975 | Hurn | 83/282 X |
| 4,104,944 | 8/1978 | Janssen | 83/471.2 |
| 4,196,648 | 4/1980 | Jones et al. | 83/365 |
| 4,212,213 | 7/1980 | Wolfilsperger et al. | 83/155 X |
| 4,257,297 | 3/1981 | Nidbella | 83/520 X |
| 4,281,696 | 8/1981 | Howard et al. | 83/56 X |
| 4,449,558 | 5/1984 | Wiegand | 83/471.2 X |
| 4,468,992 | 9/1984 | McGeehee | 144/378 X |
| 4,503,740 | 3/1985 | Brand et al. | 83/522 X |

Primary Examiner—Frank T. Yost
Attorney, Agent, or Firm—Fuller, Puerner & Hohenfeldt

[57] ABSTRACT

A carriage on the frame of a lumber edger is driven on tracks longitudinally from one limit to another. Two motors are arranged with their corresponding output shafts coaxial and facing each other. A saw blade is mounted to each shaft. The motors are mounted to laterally extending tracks on the carriage and actuators are provided for shifting the motors, and hence, the parallel saw blades toward and away from each other so that when the saws are translated longitudinally they will rip the irregular edges from a board. A chain conveyor runs through the machine frame and transports the boards to a position under the saws with the length of the boards directed longitudinally. When a rough board arrives under the saws the lines along which the saws will cut are marked on the board with parallel laser light beams. The saws are shifted laterally until the light lines are just inside of both rough edges. The board is then lifted off of the conveyor chains on a structural beam and clamped against a fixed structural beam. The carriage is then translated longitudinally and the saws rip off the edges.

2 Claims, 9 Drawing Figures

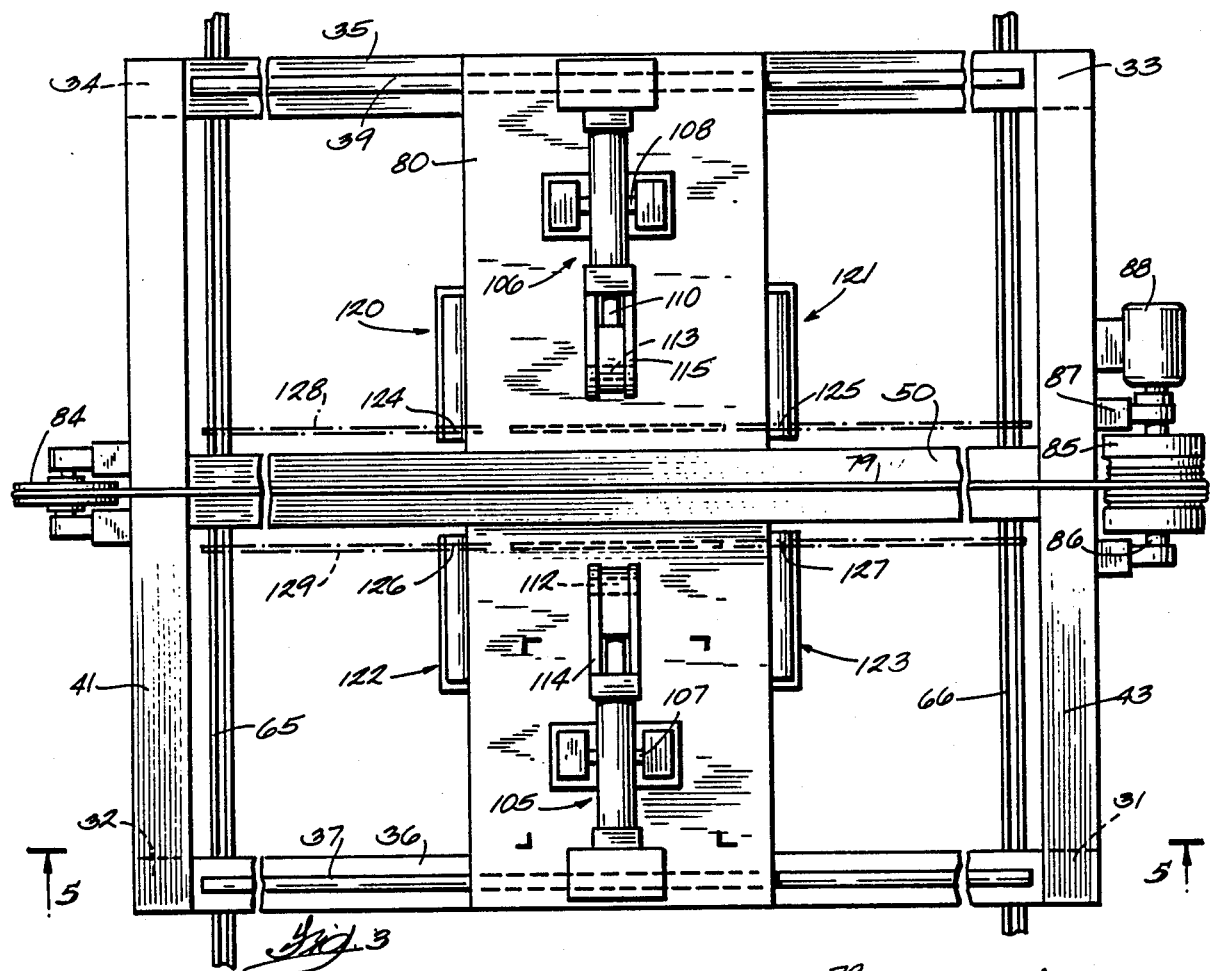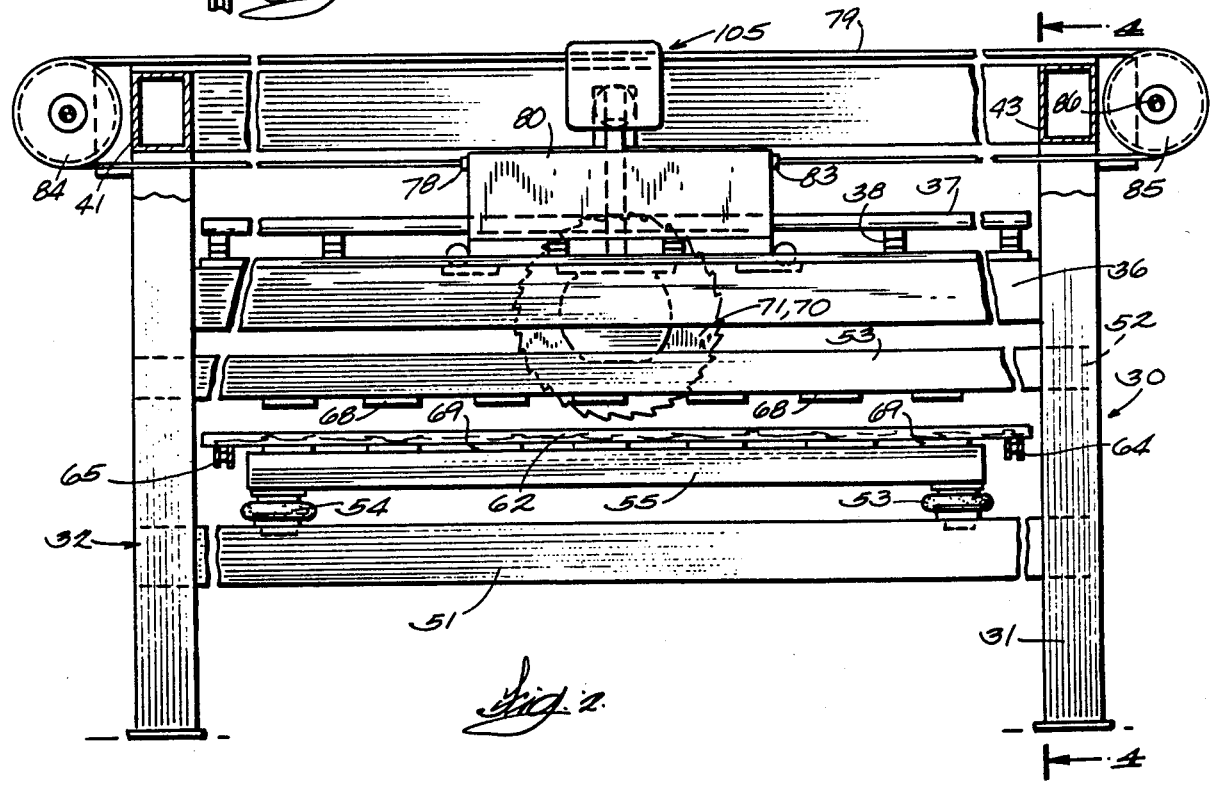

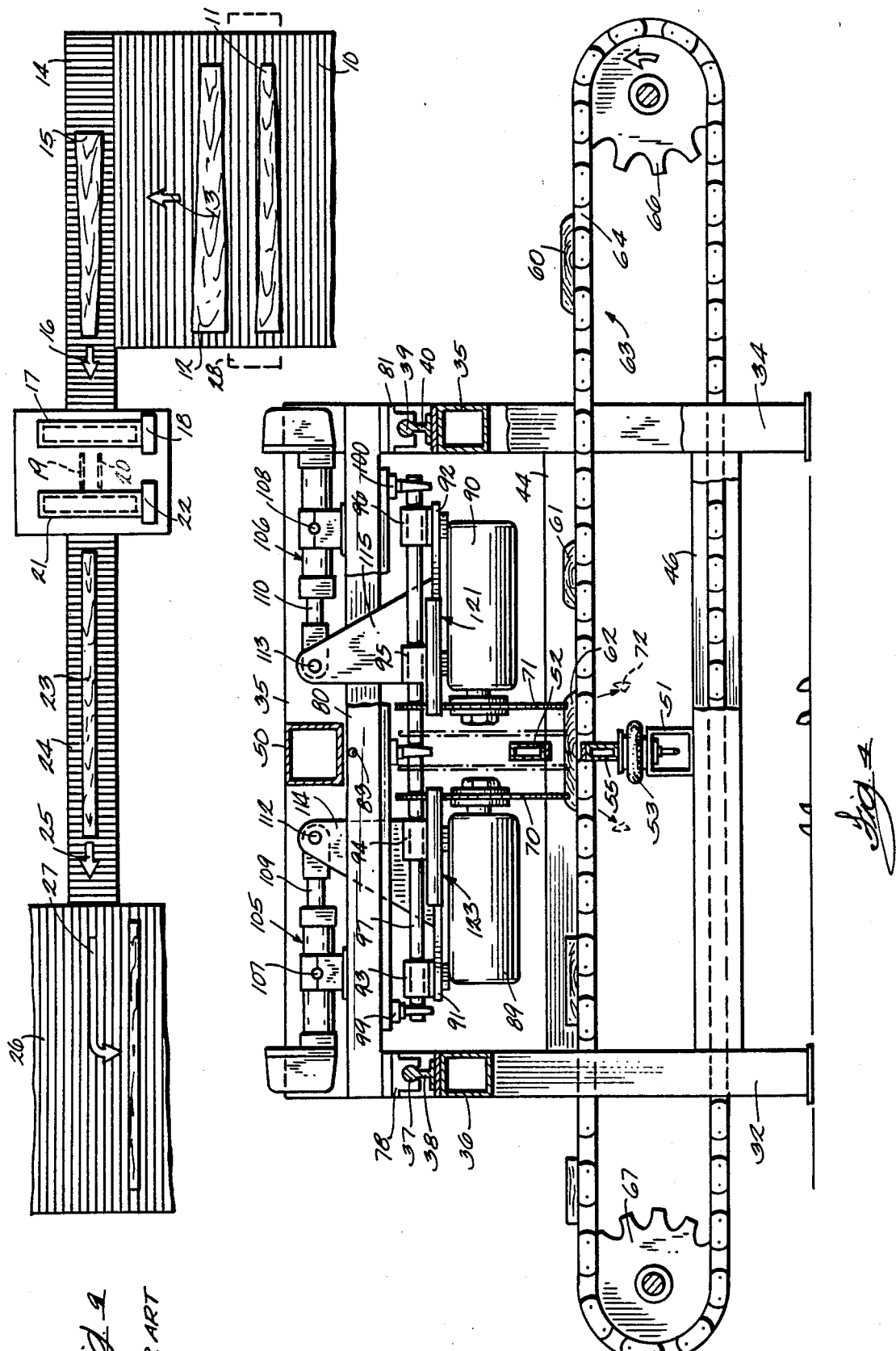

LUMBER EDGER

BACKGROUND OF THE INVENTION

The invention disclosed herein is a lumber edger.

After logs are sawed into common board thicknesses such as one, two, four or six inches, the boards are passed through edgers which cut off the generally round edges and produces a board which has square edges and a width falling usually within one of several standard width classifications. After edging, the boards pass through a trimmer which trims their ends to achieve a final board length. Edgers which are in such widespread use as to be considered the standard of the lumbering industry were introduced several decades ago and are still basically the same as they were at the time they were introduced. It seems to have become an accepted fact that conventional edgers necessarily had to occupy the great amount of space that they do and that the lumber had to be handled in one specific fashion in order to produce the necessary results. In prior art edger machines two saw blades are motor driven and arranged in adjustable spaced relationship relative to each other so that a board of predetermined width including its edge irregularities can be pushed between the blades for trimming opposite edges at the same time. There are usually pairs of pressure generating rollers on the in-feed and out-feed side of the saw blades through whose nip the board is passed as it is being edged. Since the board is in motion relative to the saw blades, the board can never be gripped positively. A consequence of this is that when the saw blades bind in a board periodically, the high velocity saws may eject the board at high velocity and damage surrounding machinery and seriously injure or kill the machine operator despite safety precautions that are taken. It is known that boards can be ejected from conventional edgers at initial velocities of as high as 10,000 feet per minute which confirms the hazard of working around prior art edgers. Of course, some purported safety guards have been devised such as hanging heavy chains adjacent the line of movement of the boards, at least on the side where the operator stands. Sometimes, however, the pieces that are being trimmed from the board are ejected like arrows and, because they are relatively small in cross-section, it is very difficult to provide safety barriers to stop them.

Another generally recognized disadvantage of conventional edgers is the amount of space they occupy in the lumber mill. In conventional edgers, the boards are conducted to the edger on an in-feed conveyor which is wide enough to accommodate the longest board obtainable from the longest log length sawed in the particular mill. In other words, the length of the boards lie across the width of the conveyor. At the end of this in-feed conveyor, the boards are transferred to another conveyor moving perpendicular to the in-feed conveyor which directs the boards toward the saw blades. After being transferred from the in-feed conveyor to the conveyor that conveys the boards to the saws, the boards have changed direction and their lengths are aligned with the length of the conveyor. After passing through the saws and undergoing edging, the boards are passed on to an output conveyor which can be no shorter than the longest board expected to be treated nor can it be any shorter than the conveyor on the input side of the saws. The boards make another change in direction as they leave the output conveyor and go on to a final conveyor that is running perpendicular to the output conveyor. The final conveyor usually directs the boards to an end trimmer. Thus, in the prior art edger installations, there are four separate conveyors which change the direction of the boards twice. Disadvantages of this arrangement are that a large amount of energy is required to drive the plurality of the conveyors, capital costs are high, more maintenance is required for the conveyors, and the apparatus takes up a large amount of space.

SUMMARY OF THE INVENTION

Objectives of the present invention are to improve the efficiency and safety of edgers and to reduce their cost and the amount of space that they occupy in the sawmill.

Briefly stated, the improved edger described herein departs from tradition by having the saw blades move along the edges of a clamped board simultaneously instead of pushing the board into the blades. The blades are held by arbors on the shafts of individual motors. The axes of the motor shafts are coaxial and spaced apart from each other. The motors are mounted on a longitudinally driven carriage and are movable laterally on the carriage which provides for setting the saw blades at a distance from each other sufficiently great to trim off opposite edges from each board and obtain a board of maximum width. A single conveyor moves the boards into and out of the edger without any change in direction being necessary. The boards enter in substantial parallelism with the path along which the saw blades move. Each board is conveyed to a position underneath the saw blades. Sets of lasers project parallel light beam lines onto the entire length of the board in alignment with the saw blades. The two parallel light lines let the operator know where the saw blades would land relative to the edges so that the operator can adjust the saws toward or away from each other to maximize the width of the board after it is edged. Then lifting devices are actuated to lift the board off of the conveyor and clamp it against an elongated stationary bar or member that is about equal in length to the longest board intended to be processed in the edger. When the board is clamped, the main carriage is translated longitudinally and the saws cut lengthwise of each edge of the board and the carriage stops at a predetermined limit. After that, the board is lowered onto the conveyor chain and transported out of the edger machine in the same orientation in which it entered. When the next board comes in and is clamped for sawing, the edging saws move from the one longitudinal travel limit reached in processing the preceding board to an opposite limit at which time the board is unclamped, lowered onto the conveyor and conveyed away. There is no need to be concerned about whether the saws are upcutting or downcutting relative to the board because the board is clamped tightly during sawing.

How the foregoing objectives and other features of the invention are achieved will be evident in the more detailed description of an illustrative embodiment of the invention which will now be set forth in reference to the drawings.

DESCRIPTION OF THE DRAWINGS

FIG. 2 is a front elevation of the edger with parts removed and with the board not lifted into the saw blades and with the saw blades in a position in which they would not actually be when the board is unlifted from the conveyor and not clamped but which shows the parts arranged in a manner that simplifies describing the structure;

FIG. 3 is a plan view of the edger depicted in FIG. 2;

FIG. 4 is a side elevation view, partly in section, taken on a line corresponding with 4—4 in FIG. 2;

DESCRIPTION OF A PREFERRED EMBODIMENT

Figure 1:
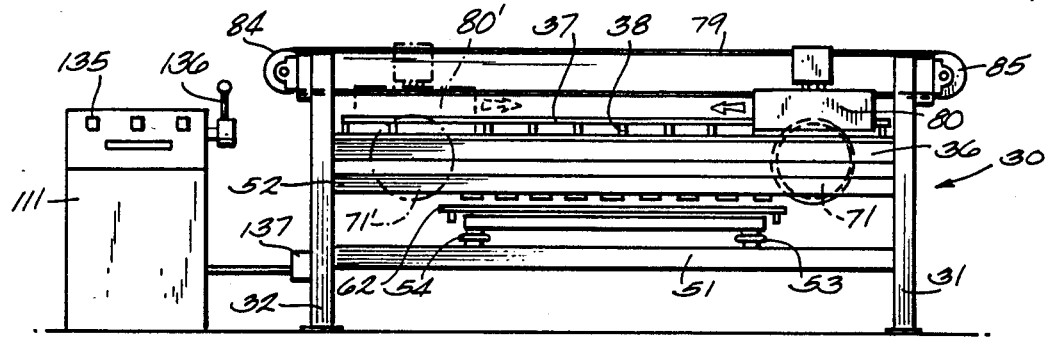
FIG. 1 is a front elevation view of the new edger.

First of all, the prior art edger arrangement shown diagrammatically in FIG. 9 will be discussed. In FIG. 9, there is a first conveyor 10 which conveys boards such as those marked 11 and 12 in the direction of the arrow 13 from the saw, not shown, that rips the logs into boards. The boards transfer to a second conveyor 14 which changes the direction of the boards and moves them lengthwise such as is happening to board 15. Board 15, moving in the direction of the arrow 16, enters in the nip of a pair of vertically separated rollers 17 which are driven by a motor 18 to advance the leading end of the board into two independently driven spaced apart saw blades 19 and 20. The motors for driving the saw blades rotationally have been omitted for the sake of brevity. As board 15 advances against the saw blade under the influence of driven rollers 17 the board passes into the nip of a pair of vertically spaced apart rollers 21 which are driven rotationally by a motor 22. As the edges are trimmed, the rollers 21 advance the board, marked 23, onto a third conveyor 24. Here the board is moving in the direction of the arrow 25 after which it goes on to a fourth conveyor 26 where it makes another change in direction as indicated by the arrow 27. Conveyor 26 could be running in the opposite direction as well.

Still viewing the FIG. 9 diagram in accordance with the invention, only a single conveyor of the type marked 10 will be required for moving the boards from the rip saw to the edger and out of the edger to an end trimmer. Proportionately, the new edger will occupy about as much space is as occupied by the dashed line rectangle 28 in FIG. 9 and conveyor 10 will run right through the edger.

Refer now to FIG. 1 for identification of some of the parts of the new edger. A line extending horizontally from left to right in the plane of the paper will be designated the longitudinal direction and a horizontal line perpendicular to the paper and to the longitudinal direction is designated the lateral direction.

As seen in FIG. 1, the new lumber edger mechanism is based on a frame 30 having four vertical legs arranged in a rectangle with a leg at each corner. Front legs 31 and 32 are visible in FIG. 1 and rear legs 33 and 34 are shown in the FIG. 3 plan view. The rear legs are joined by a rear horizontal beam 35, visible in FIG. 3, which is at an elevation about half way between the top and bottom of legs 33 and 34. Front legs 31 and 32 are joined by a beam 36 which is at the same elevation as rear beam 35. In FIG. 1, beam 36 is in the forefront and beam 35 is behind it. As shown in FIG. 1, front beam 36 supports track means in the form of a guide rod 37 on a plurality of posts 38. Rear beam 35 supports a similar track means or guide rod 39 on posts 40. The left side corner posts 32 and 34 of the machine frame are tied together at their top by a laterally extending beam 41. The right side corner posts 31 and 33 are tied together by a corresponding laterally extending beam 43 as shown clearly in FIGS. 2 and 3. There are two more pairs of parallel beams spanning between the front and rear legs of the frame on the left and right sides. A beam 44 on the left side spans between front and rear legs 32 and 34 at one elevation and a corresponding beam 45 on the right side spans between front and rear legs 31 and 33. At a lower elevation, there is another pair of laterally extending beams 46 and 47 joining the front and rear legs on the left and right sides of the frame. All of the beams are of the box girder type and they are joined to the legs by welding.

Figure 5:
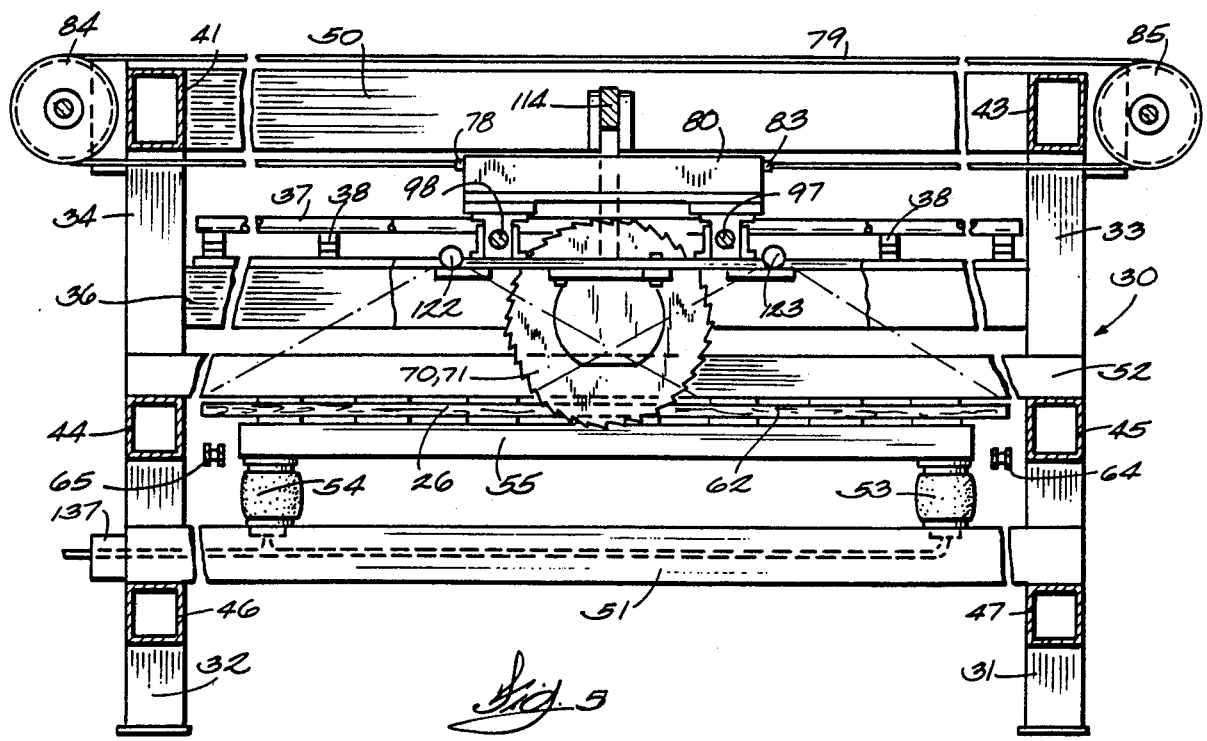
FIG. 5 is a front elevation view showing the board lifted from the conveyor and clamped and with the saws having trimmed about one-half of the length of the edges of the board.

There is another longitudinally extending beam 50 which is welded at opposite ends to laterally extending uppermost laterally extending beams 41 and 43 at the left and right ends of the frame as can be seen clearly in FIGS. 4 and 5.

There is another lowermost longitudinal beam 51 which spans horizontally for its opposite ends to rest on laterally extending beams 46 and 47 which span between the corner legs.

There is another longitudinally extending beam member 52 whose opposite ends are welded to laterally extending beams 44 and 45 as depicted in FIG. 5, for example. As can be seen in FIG. 4, beam 52 is a box beam type but has a narrower width than the other beams which make up the frame 30. The width of beam 52 is slightly less than the width of the narrowest board that can result after it has been edged.

As shown in FIGS. 1, 2, 4 and 5, there are two flexible and sealed boots 53 and 54 mounted to longitudinally extending beam 51. Air inflatable boots 53 and 54 are, for example, of the type known in the trade as Firestone Airmounts. A beam member 55 is supported on and fastened to the airmounts. In FIGS. 1, 2 and 4, the airmounts are shown in a deflated condition in which case board clamping beam 55 is at its greatest distance from the parallel fixed cooperating board clamping beam 52. In FIG. 4, for example, boards 60, 61 and 62 of different widths are on a chain conveyor 63 for being advanced to a position between upper stationary clamping beam 52 and lower vertically movable clamping beam 55. Chain conveyor 63 is comprised of two closed loop chains, the upper runs of which are marked 64 and 65 in FIGS. 2 and 5, for instance. The chains run on sprockets such as the pair marked 66 and 67 in FIG. 4. The chains convey the boards in and out of the edger. As is evident in FIG. 2, a board 62 which is to be edged, has its opposite ends resting on chains 64 and 65. When the board is substantially centered between clamping beams 52 and 55, airmounts 53 and 54 are inflated so as to elevate clamping beam 55 and lift the unedged board 62 off of conveyor chains 64 and 65. The airmounts are expanded sufficiently for lower clamping beam 55 to press the board tightly against the lower surface of beam 52. As is evident in FIG. 2 and some of the other figures, the bottom surface of upper clamping beam 52 and the top surface of lower movable clamping beam 55 are provided with a series of rubber pads 68 and 69 which enhance the grip the clamping beams take on the board that is to be edged by translating a pair of saw blades 70 and 71 along the board. After the edges are trimmed and the sawdust and chips 72 have fallen, airmounts 53 and 54 are deflated such that the ends of the board drop onto the conveyor chains 64 and 65 and the conveyor is started to advance the board toward the outlet of the machine which is at the left in FIG. 4 and advance another board into a position for being lifted, clamped and edged. Those skilled in the art will realize that hydraulic or mechanical lifting devices could be used in place of the airmounts.

As shown most clearly in FIGS. 3 and 5, there is a carriage 80 mounted for sliding on previously mentioned guide rods 37 and 39. There are linear bearings 81 and 82 mounted to the carriage 80 to facilitate their reciprocating transit along guide rods 37 and 39. As shown in FIGS. 2 and 3, the carriage is driven between left and right limits by having the opposite ends of a cable 79 being attached to it at anchor points 78 and 83. Closed loop cable 81 runs on an idler sheave 84 and makes several wraps around a winding and unwinding spirally groove drum 85. As shown in FIG. 3, drum 85 is mounted to a shaft 86 that is supported in pillow blocks 87 and is driven reversibly by a hydraulic motor 88 in the embodiment being described.

Motors 89 and 90 which rotate the saw blades 70 and 71 of the edger are mounted to carriage 80 in a manner that allows the motor and, hence, the saw blades 70 and 71 to be moved laterally toward and away from each other at the option of the machine operator to set the blades at a distance apart that will permit maximizing the width of the board and minimizing the amount of edge material that is cut away to yield a board that has square edges. Motor 89 is fastened to a plate 91 and motor 90 is fastened to a plate 92. There are linear bearings 93-96 for the motors and these linear bearings permit the motors to translate laterally along a pair of track means in the form of stationary cylindrical guide rods or shafts 97 and 98. Guide rods 97 and 98 are supported from the bottom of carriage 80 by means of hangers such as those marked 99 and 100 in FIG. 4. In that figure, saw blades 70 and 71 are drawn in phantom lines to show that they can edge a board that is just a little wider than the clamping beams 52 and 55.

The saw driving motors 89 and 90 and, hence, circular saw blades 70 and 71 are adjustable coordinately with respect to a vertical plane running through the centers of clamping jaws 52 and 55 under the influence of a pair of air actuators 105 and 106. In an actual embodiment, by way of example and not limitation, commercially available air actuators known as Tempisonic cylinders are used. Hydraulic actuators could be used. Actuators 105 and 106 are mounted on trunions 107 and 108 and to the top of the carriage 80. These actuators include devices which produce an electric signal corresponding to the amount by which their push rods 109 and 110 are extended or contracted so that, by proportionality, the exact position of the saw blades can be communicated to the operator's control console which is represented by the device marked 111 in FIG. 1. The ends of push rods 109 and 110 are pivotally connected at 112 and 113 to links 114 and 115 whose upper ends are formed in the shape of a clevice. Their lower ends are welded to motor mounting plates 91 and 92. It will be evident that as actuator rods 109 and 110 extend toward and away from each other, motors will translate on guide rods 97 and 98 and the saw blades 70 and 71 will move toward or away from each other correspondingly.

When a board that is not as yet edged is advanced to a position under the saw blades as in FIG. 4 and before it is elevated to be cut, the machine operator has to make a judgment as to the widest board which can be obtained from the pre-edged board. It is, of course, unlikely that the operator could always adjust the spacing between the saw blades by just the right amount to get the widest square edged board out of the pre-edged board. Obtaining the widest board permissible without going into defective edging is facilitated, in accordance with the present invention, by using laser line markers. Thus, as one may see in the FIG. 3 plan view, four lasers 120-123 are mounted to longitudinally reciprocable carriage 80. The lasers have light beam exit ports 124, 125, 126 and 127, not readily visible, at their inner ends. The optical system, not visible, built into the lasers results in projection of light beams or sharp stripes of light which impinge on the top of the board that is about to undergo edging. The light beams 124 and 125 from the exit ports of lasers 120 and 121 combine to produce a single bright red line 128 on the top surface of the board. Likewise, the beams from ports 126 and 127 of lasers 122 and 123 combine to form another bright red sharp line 129, which by proper adjustment or alignment of the lasers results in 129 being exactly parallel to red line 128. The laser light beam lines 128 and 129 are in exact alignment with the saw blades, taking the kerf into account, and the operator knows that when the board is to be lifted the saw blades will fall exactly on the lines demarked by the laser beams. In FIG. 5, two of the diverging laser beams that form the single marker line 128 on the board 62 are illustrated with dashed lines. In this particular case, there is overlap between the fan-shaped beams from the lasers overlap to form a single continuous straight line of light.

Figure 6:
FIGS. 6–8 illustrate, respectively, a board as it comes off of the sawmill, a board with the laser light stripes projected on it to facilitate estimation of the maximum width obtainable from it after edging, and a board after it is edged; and, FIG. 9 is a diagram of a prior art edger arrangement.
Figure 7:
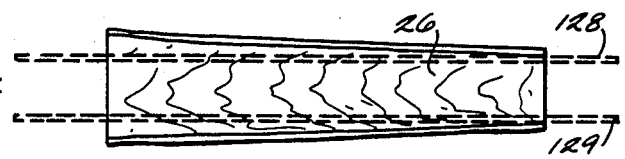
Figure 8:
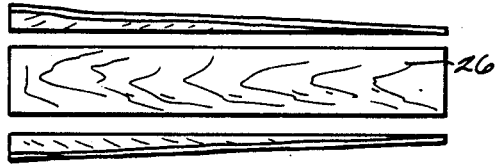

FIG. 6 shows a board 26 which has edges of medium irregularity and some taper. When this board is translated to the board lifting and clamping position, the operator, using push buttons 135 on controller 111 causes the saw blades to shift toward or away from each other until the laser beams 128 and 129 lines are seen to be inside of both edges of the board as shown in FIG. 7. After edging, as shown in FIG. 8, the resulting board has parallel edges and there are two strips of waste. Usually, however, the strips that are trimmed at the edges are used independently to make pulp for paper. The sawdust is often collected and used for fuel.

An operating cycle of the edger will now be described. The boards are transported into the framework of the edger on a chain conveyor and moved along a line that is perpendicular to the length dimension of the boards. As shown in FIG. 2, when a board is aligned with the saws, a valve control lever 136 is operated and it delivers air through a valve 137 which pressurizes the airmounts 53 and 54, thus lifting the board off of the conveyor chains and grasping it firmly between the jaws or clamping members 52 and 55. The operator then moves the lasers and saw blades jointly inwardly or outwardly to make sure that when the saw blades begin to translate longitudinally along the edges of the board that what remains after edging is only sound board. The operator then uses controller 111 to cause the carriage 80 to translate from one limit position in which it is at rest to another limit position at which it comes to a stop. For instance, assume in FIG. 1 that the board has just been clamped and is ready for the carriage 80 to be translated so as to pass the saw 71 and its counterpart 72 along the edge of the board 62. The saw blades 71 and 72 move in unison lengthwise of the board to cut its edges off. When board 62, for instance, is edged and released and dropped onto the conveyor chains, the next board is brought into clamping and edging position on the conveyor. When the operator has determined, using the laser light lines, that the saw blades will cut away the defective edges, the saw blades start from the left limit where one of them is marked 71' in FIG. 1 where the saw blade is depicted in phantom lines and then the saw blades will move back to their rightmost limit. In other words, when one board is being trimmed, the saws move from right to left and come to rest and when the next board is being trimmed, the saws move from left to right, so any time they are translating they are actively cutting. The only time the saws would be at the middle of the length of a board being edged is when the saw blades are translating from one end of the board to the opposite end. In FIG. 5, for instance, the saw blades 70 and 71 are in the process of cutting and translating which could be the case since the airmounts 53 and 54 are expanded and the board 26 is clamped. In FIG. 2, however, draftsman's license is exploited where the saw blades are at the center of the board and the board 62 is not lifted or clamped. In realty, the carriage 80 and saw blades 70 and 71 would be at either their left limit or right limit positions. The saws never make an idle translation from one limit to the other. They cut in both directions of carriage translation. It is immaterial whether the saws downcut or upcut, since the board being edged is so firmly clamped that there is no more likelihood that the board can be displaced or driven away by the saw blade when the saws are moving in one direction or the other.

All of the components of the machine frame 30 essential for supporting or guiding movable parts of the machine have been depicted. In an actual embodiment, there are some additional angular reenforcing beams, not shown, which span diagonally across the corner such as from longitudinally extending beam 36 to corner leg 31 of the frame. These reenforcing members, however, have been omitted to permit better visualization of the parts of the edger that are interior of the frame.

When boards of comparatively inexpensive soft woods, such as pine, are being edged, the custom is to obtain a board that has the maximum standard width obtainable from the board under the saws. For instance, raw pine boards may be edged down to standard width dimensions such as 12", 10", 8", 6", and so forth. The controller 111 is so designed that a button simply has to be pressed to set the saw blades apart at some standard distance estimated by the operator using the laser light lines as a guide. The controller used for edging more expensive hardwoods, however, does not use incremental steps, it allows for stepless adjustment of the distance between saw blades so that every bit of the usable width of a board is saved.

The edger model that has been described can be looked upon as being for the shortest boards likely to be handled in a given mill. The size would be scaled upwardly for handling longer boards. One thing that would be done would be to use a much wider chain conveyor with more than the two parallel chain runs which are shown in the illustrated model. In such cases, several sections of the clamping beams are used and a space is allowed between them so that the chains can pick up the boards, not only at their ends, but at intermediate points along their lengths. Of course, the carriage travel distance and the length of the frame side members could be scaled up, too. Those skilled in lumbermill technology will appreciate that the type of edger described herein has the merit of being incorporated in a variety of sawmill equipment configurations. One of the reasons for this is that conveyors which were required on each side of the edger in prior art edger arrangements are unnecessary when the new edger design described herein is used.

I claim:

1. A lumber edger comprising:

frame means having front and rear openings, track means mounted to said frame means and a carriage translatable reversibly in a longitudinal direction on said track means, means for translating said carriage between longitudinally spaced apart limits, two motors and track means on which said motors are supported for translating in a lateral direction, said motors each having a shaft coaxial with the other and a circular saw mounted to each shaft such that the saws are in parallelism, means for translating the saws toward and away from each other to provide for determining the final width of a board that is to be edged by translating the saws in the longitudinal direction, a conveyor system for conveying boards into said frame means through one of said openings and through said frame means and out the other of said openings, said conveyor system comprising at least two closed chain loops arranged with corresponding upper runs translatable in the lateral direction in parallel with each other, said chain loops being spaced apart in the longitudinal direction and at an elevation below the elevation of the cutting edges of said saws, an upper clamping beam member fastened to said frame means and extending longitudinally of said frame means in a position between said saws, a lower clamping beam member arranged in parallelism with said upper beam member and extendible and contractible devices on which said lower beam member is supported, said lower clamping beam member extending between said upper runs of the conveyor chains, extending said devices causing said lower clamping beam member to elevate and lift a board conveyed into a position of superposition over said lower clamping beam and to clamp said board against said upper clamping beam such that said saws can be passed along laterally opposite sides of said clamping beam members while cutting along the edges of the board, contracting said devices causing said lower clamping beam member to descend and deposit the edged board on said chains again for being conveyed out of said frame.

2. The lumber edger according to claim 1 including laser means mounted for translating respectively, in correspondence with said motors, said laser means projecting light beams that are aligned with the said saw blades and which form parallel lines of light on a board in the translational path of said saw blades to indicate where the blades will cut inside of the board edges.

* * * * *